United States Patent [19]

Shibata

[11] Patent Number: 4,467,462
[45] Date of Patent: Aug. 21, 1984

[54] SIGNAL DETECTION SYSTEM FOR USE IN AN OPTICALLY REPRODUCING APPARATUS

[75] Inventor: Tsutomu Shibata, Hachioji, Japan

[73] Assignee: Olympus Optical Co., Ltd., Tokyo, Japan

[21] Appl. No.: 314,482

[22] Filed: Oct. 23, 1981

[30] Foreign Application Priority Data

Oct. 25, 1980 [JP] Japan .................. 55-149565

[51] Int. Cl.$^3$ .................. G11B 7/12; G11B 21/00
[52] U.S. Cl. .................. 369/45; 369/44; 369/46
[58] Field of Search .................. 369/44–46, 369/109–112

[56] References Cited

U.S. PATENT DOCUMENTS

| | | | |
|---|---|---|---|
| 4,011,400 | 3/1977 | Simons et al. | 369/46 X |
| 4,025,949 | 5/1977 | Whitman | 369/46 X |
| 4,037,929 | 6/1977 | Bricot et al. | 369/46 X |
| 4,051,527 | 9/1977 | Braat | 369/46 X |
| 4,057,833 | 11/1977 | Braat . | |
| 4,059,841 | 11/1977 | Bricot et al. | 369/46 X |
| 4,163,149 | 7/1979 | Sawano et al. | 369/45 X |
| 4,268,745 | 5/1981 | Okano | 369/46 X |
| 4,290,132 | 9/1981 | Kotaka | 369/46 X |
| 4,293,944 | 10/1981 | Izumita et al. | 369/46 X |
| 4,296,316 | 10/1981 | Tsuji et al. | 369/45 X |
| 4,358,200 | 11/1982 | Heemskerk et al. | 369/45 X |

*Primary Examiner*—Raymond F. Cardillo, Jr.
*Attorney, Agent, or Firm*—Parkhurst & Oliff

[57] ABSTRACT

A light beam emitted from a laser light source is made incident upon a video disc by means of an objective lens and a light flux reflected by the disc is made incident upon a light detector arranged in a far field of an information track of the disc. The light detector includes four light receiving regions divided in a track direction and a direction perpendicular to the track direction. A first sum of output signals from diagonally aligned two light receiving regions and a second sum of the remaining two light receiving regions are derived and then a sum signal and a difference signal of the first and second sums are formed. The difference signals are sampled by sampling pulses generated at positive going and/or negative going zero cross points of the sum signal to generate sampled values. A tracking error signal is obtained from sampled values.

24 Claims, 31 Drawing Figures

FIG._1 PRIOR ART
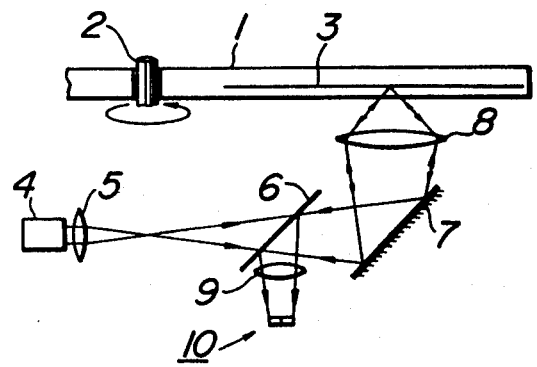
FIG._2 PRIOR ART
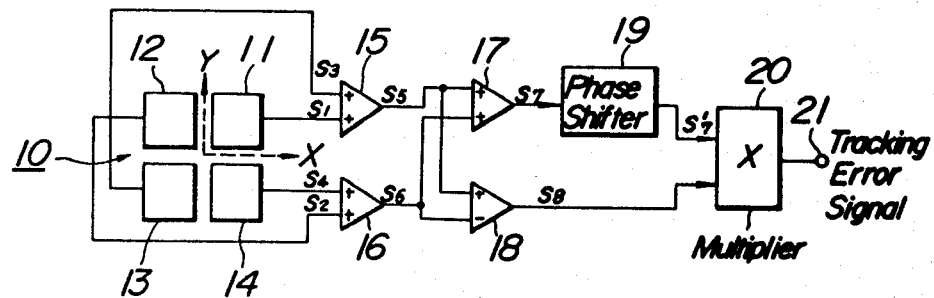
PRIOR ART
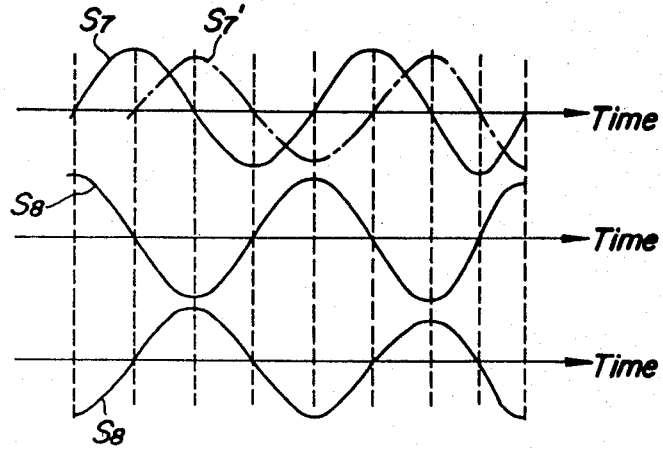
FIG._3A
Sum Signal
FIG._3B
Leftward Deviation
FIG._3C
Rightward Deviation

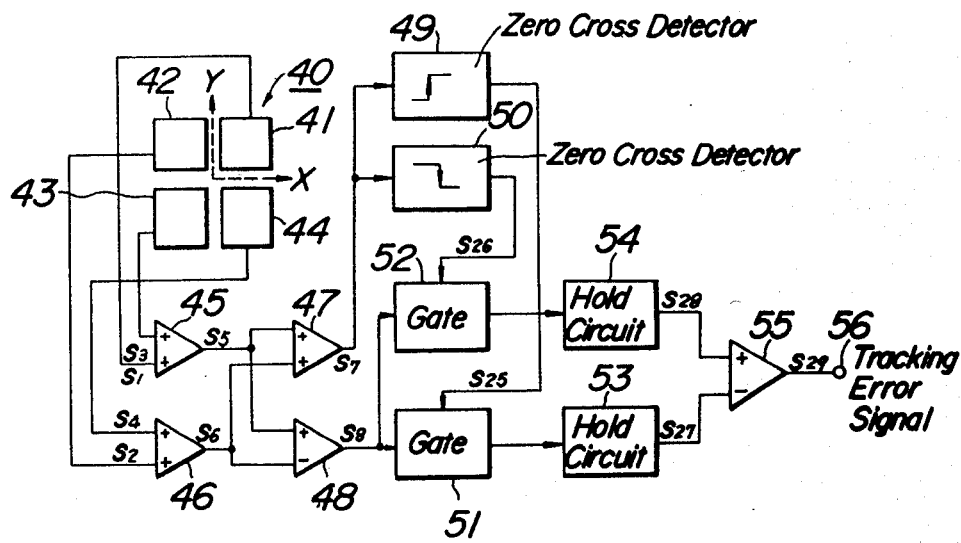
FIG.4
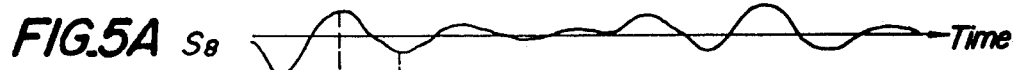
FIG.5A S8
FIG.5B S7
FIG.5C S25
FIG.5D S26
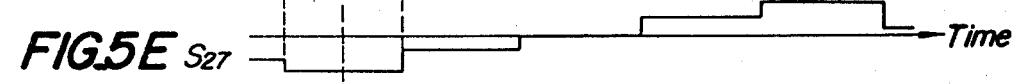
FIG.5E S27
FIG.5F S28
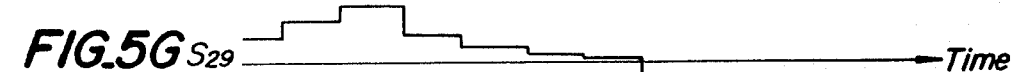
FIG.5G S29

FIG_7

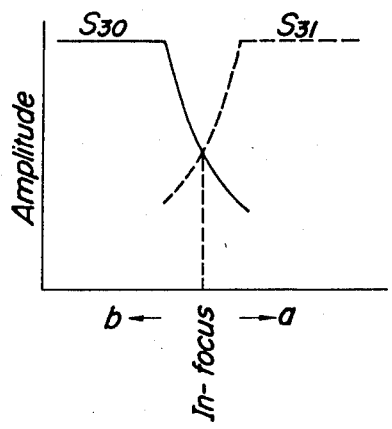
FIG_12A
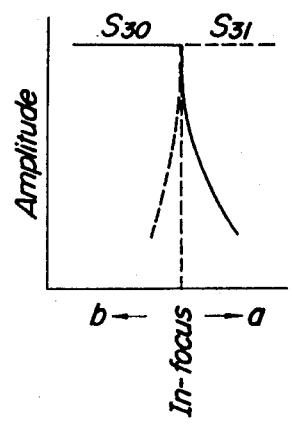
FIG_12B
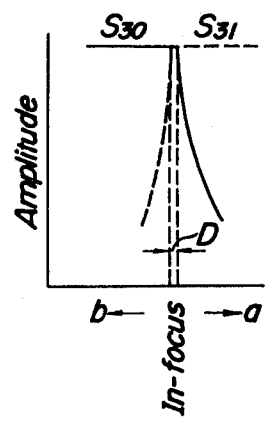
FIG_12C
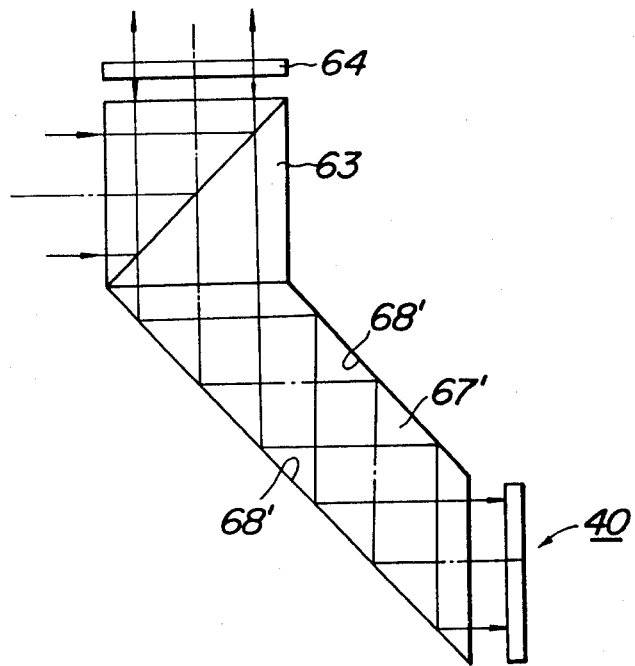
FIG_13

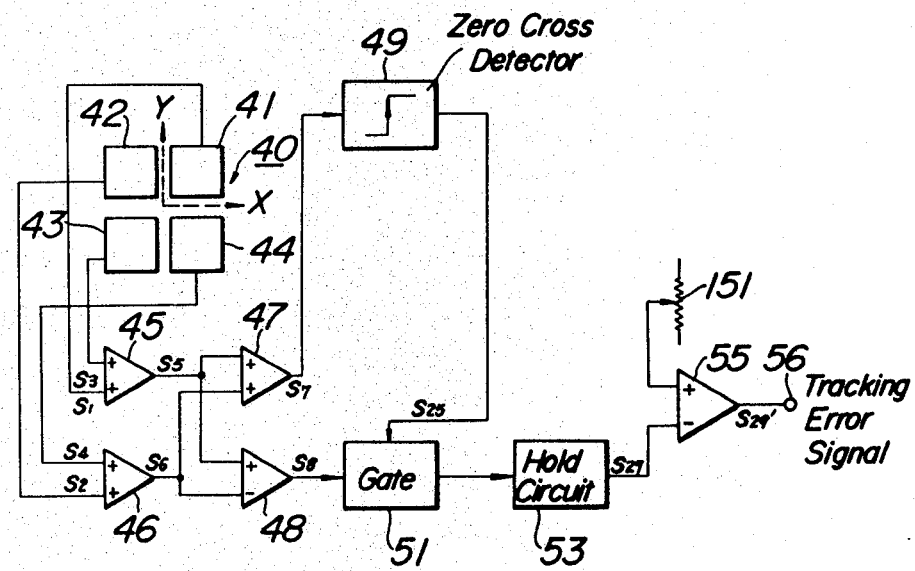
FIG_15
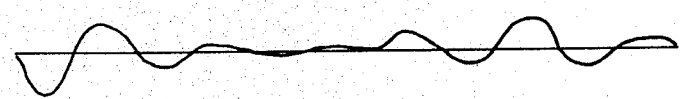
FIG_16A S8
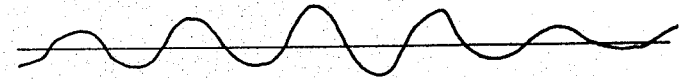
FIG_16B S7
FIG_16C S25
FIG_16D S29'

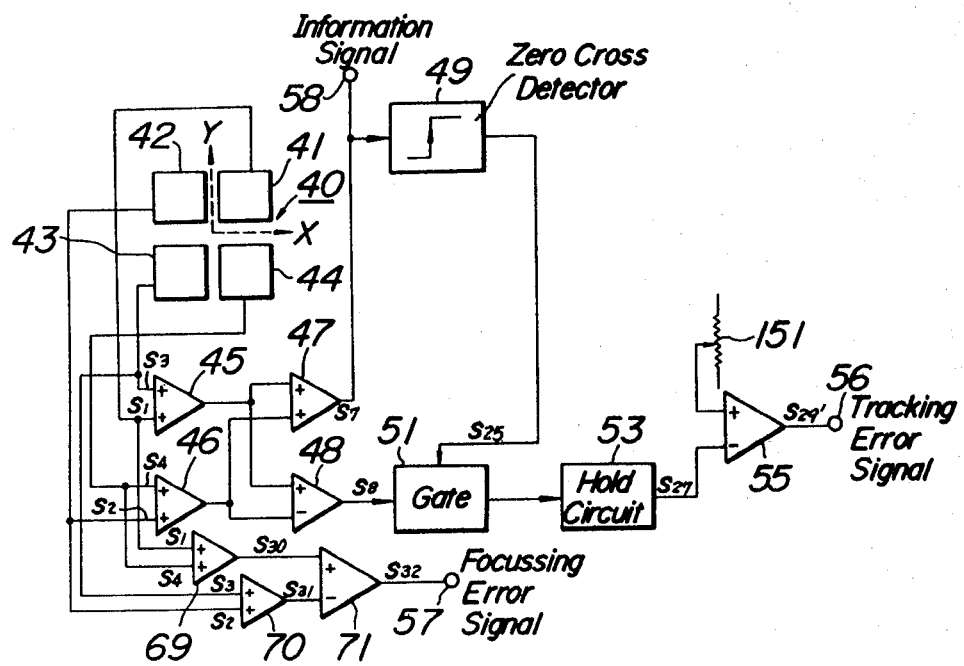

SIGNAL DETECTION SYSTEM FOR USE IN AN OPTICALLY REPRODUCING APPARATUS

BACKGROUND OF THE INVENTION

The present invention relates to a signal detection system for use in an optical reproducing apparatus in which a light beam emitted from a light source is made incident by means of an objective lens upon a record medium having recorded thereon an information signal along one or more tracks and in which the light beam modulated by the information signal and collected by the objective lens is received by a light detector arranged in a far field of the track of the record medium and comprising four light receiving regions divided about an optical axis of the incident light beam in orthogonal directions, one direction being in parallel with a track direction and the other direction being perpendicular to the track direction.

Such an information reproducing apparatus has been known and has been advantageously applied to an apparatus in which a scanning light spot is projected by an objective lens onto information tracks formed spirally or concentrically in a disc-shaped record medium to read information recorded along the tracks.

In an apparatus for reproducing or picking-up an information signal from the above mentioned record medium, the record medium is usually a digital video disc, a digital audio disc or a digital data disc in which encoded video, audio and/or data signals are recorded as optical information such as optical transmittivity, reflection and phase properties. While such a disc is rotated at a high speed such as thirty revolutions per second, i.e. 1,800 rpm, a laser beam emitted from a laser light source is focussed on the tracks of the disc as a light spot and the optical information is read out by detecting the reflected light beam modulated by the information. One of important properties of such a record medium is a very high density of recorded information and thus a width of the information track is very narrow and a space between successive tracks, i.e. a track pitch is also very narrow. In a typical video disc, a pitch of the tracks amounts only to 1.6 µm. Therefore, the diameter of light spot should be correspondingly small such as 1 to 2 µm. In order to pick-up correctly the recorded information from such tracks having very narrow width and pitch, an error in a distance between the objective lens and the tracks, i.e. a focussing error should be reduced to as little as possible to make a spot diameter as small as possible.

To this end, the apparatus is provided with a focussing servo control system in which an amount and a direction of a de-focussed condition of the objective lens with respect to the disc information surface are detected to produce a focussing error signal and the objective lens is moved in a direction of the optical axis of the objective lens in accordance with the detected focussing error signal.

Furthermore, during reproduction, the light spot should follow the track precisely. For this purpose, the reproducing apparatus is also provided with a tracking servo control system in which an error in a position of the light spot with respect to the track, i.e. a tracking error is detected to produce a tracking error signal and the light spot is moved in a direction perpendicular to the track, i.e. a radial direction of the disc in accordance with the detected tracking error signal.

As described above, in order to compensate the mutual deviation between the beam spot and the information track, both the focussing error signal and the tracking error signal must be detected.

FIGS. 1 to 3 show a known optical reproducing apparatus disclosed in Japanese patent application Laid-open Publication No. 93,223/77. FIG. 1 is a schematic view showing an optical system of the known optical reproducing apparatus. A disc 1 is rotated by a spindle 2 at a speed of, for instance, 1,800 rpm. In the disc 1 there are recorded an information signal along a spiral track or a number of concentric tracks 3. A light beam such as a laser beam emitted from a light source 4 is made incident upon the track 3 of the disc 1 as a small light spot by means of a lens 5, a half mirror 6, a reflection mirror 7 and an objective lens 8. A light flux reflected by the disc 1 is collected by the objective lens 8 and is made incident upon a light detector 10 by means of the reflection mirror 7, the half mirror 6 and a lens 9. The light detector 10 comprises four light receiving regions 11 to 14 divided in orthogonal directions, i.e. a first direction Y parallel to a track direction and a second direction X perpendicular to the track direction as depicted in FIG. 2. The light detector 10 is arranged at a far field of the information track 3. That is to say, the light receiving regions 11 to 14 are arranged sufficiently remote from an image of a pit construction of the information track 3 formed by the objective lens 8, so that they can separately detect diffracted beams of various orders produced by the pit construction.

As illustrated in FIG. 2, output signals $S_1$ and $S_3$ from the first and third regions 11 and 13 diagonally aligned are supplied to a first adder 15 to produce a first sum $S_5 = S_1 + S_3$. Similarly output signals $S_2$ and $S_4$ from the diagonally aligned second and fourth regions 12 and 14 are supplied to a second adder 16 to generate a second sum $S_6 = S_2 + S_4$. Then, a sum signal $S_7 = S_5 + S_6$ is obtained by a third adder 17 and a difference signal $S_8 = S_5 - S_6$ is generated by a subtractor 18. The sum signal $S_7$ is shown in FIG. 3A and constitutes a reproduced information signal which is modulated by the pit construction of the information track 3 and thus has a pit frequency. The difference signal $S_8$ is shown in FIGS. 3B and 3C and is shifted in phase by $\pi/2$ with respect to the information signal $S_7$. The shifting direction is dependent upon a direction of deviation of the light spot from the information track 3. That is to say, in FIG. 3B, the light spot deviates leftward, whereas in FIG. 3C, the light spot deviates rightward. Therefore, by delaying the sum signal $S_7$ by $\pi/2$ in a $\pi/2$ phase shifter 19 to produce a delayed sum signal $S'_7$ shown in FIG. 3A and then multiplying the delayed sum signal $S'_7$ with the difference signal $S_8$ in a multiplier 20, it is possible to generate at an output terminal 21 a tracking error signal having a polarity denoting the direction of the deviation of light spot with respect to the track and an amplitude representing an amount of the deviation. The operational principle of this known method for deriving the tracking error signal has been fully described in the abovementioned Japanese patent application Laid-open Publication No. 93,223/77 and thus, is not explained here more in detail. At any rate, the phase deviation of $\pm(\pi/2)$ will appear in the difference signal $S_8$ with respect to the sum signal $S_7$ in dependence upon the direction of the beam spot with respect to the track. In this known detection system, the phase of the sum signal $S_7$ is delayed by $\pi/2$ by means of the phase shifter 19 which may be simply constituted by a low pass filter having a phase delay of $\pi/2$ at a center frequency of the sum signal $S_7$, i.e. the pit frequency. However, in such a low pass filter, when the frequency of the sum signal $S_7$ fluctuates, the amount of delay is changed from $\pi/2$ and thus, the tracking error signal cannot be derived accurately. Such a drawback could be avoided by providing a phase locked loop for keeping the phase delay to be always $\pi/2$ for all frequencies of the sum signal $S_7$. However, such a phase locked loop is very complicated in construction and expensive in cost.

SUMMARY OF THE INVENTION

The present invention has for its object to provide a novel and useful system for detecting a tracking error signal in an accurate manner by means of a simple construction.

According to the invention, in a signal detection system for use in an optical reproducing apparatus in which a light beam emitted from a light source is made incident by means of an objective lens upon a record medium having recorded an information signal along one or more tracks and in which the light beam modulated by the information signal and collected by the objective lens is received by a light detector arranged in a far field of the track and comprising four light receiving regions divided about an optical axis of the incident light beam in orthogonal directions, one direction being in parallel with a track direction and the other direction being perpendicular to the track direction, the improvement comprises deriving a first sum $S_5$ of output signals $S_1$ and $S_3$ from two diagonally aligned light receiving regions and a second sum $S_6$ of output signals $S_2$ and $S_4$ from the remaining two diagonally aligned light receiving regions;

deriving a sum signal $S_7$ of the first and second sums $S_5$ and $S_6$ and a difference signal $S_8$ between the first and second sums $S_5$ and $S_6$;

generating sampling pulses at positive and/or negative going zero cross points of said sum signal $S_7$;

sampling said difference signal $S_8$ by said sampling pulses to generate sampled values and holding the sampled values; and processing the sampled values to derive a tracking error signal representing an amount and direction of deviation of the light spot with respect to the track in a direction perpendicular to the track direction.

BRIEF DESCRIPTION OF THE DRAWINGS

FIG. 1 is a schematic view showing an optical system of a known optical reproducing apparatus;

FIG. 2 is a block diagram of a signal processing circuit of the known tracking error detecting device shown in FIG. 1;

FIGS. 3A to 3C are waveforms for explaining the operation of the known tracking error detecting device of FIGS. 1 and 2;

FIG. 4 is a block diagram of an embodiment of a signal processing circuit for carrying out the tracking error signal detection system according to the invention;

FIGS. 5A to 5G are waveforms appearing at various points in the circuit of FIG. 4;

FIGS. 12A to 12C are graphs showing a light distribution of a beam on a light detection in case of setting a reflection surface at an angle greater, equal and smaller than a critical angle, respectively;

FIG. 13 is a schematic view showing another embodiment of the optical system for use in the signal detection system according to the invention;

FIG. 15 is a block diagram of another embodiment of the signal processing circuit of the signal detection system according to the invention;

FIGS. 16A to 16D are waveforms appearing at various points in the circuit shown in FIG. 15; and FIG. 17 is a block diagram illustrating still another embodiment of the signal processing circuit of the signal detection system according to the invention.

DESCRIPTION OF THE PREFERRED EMBODIMENTS

Figure 6:
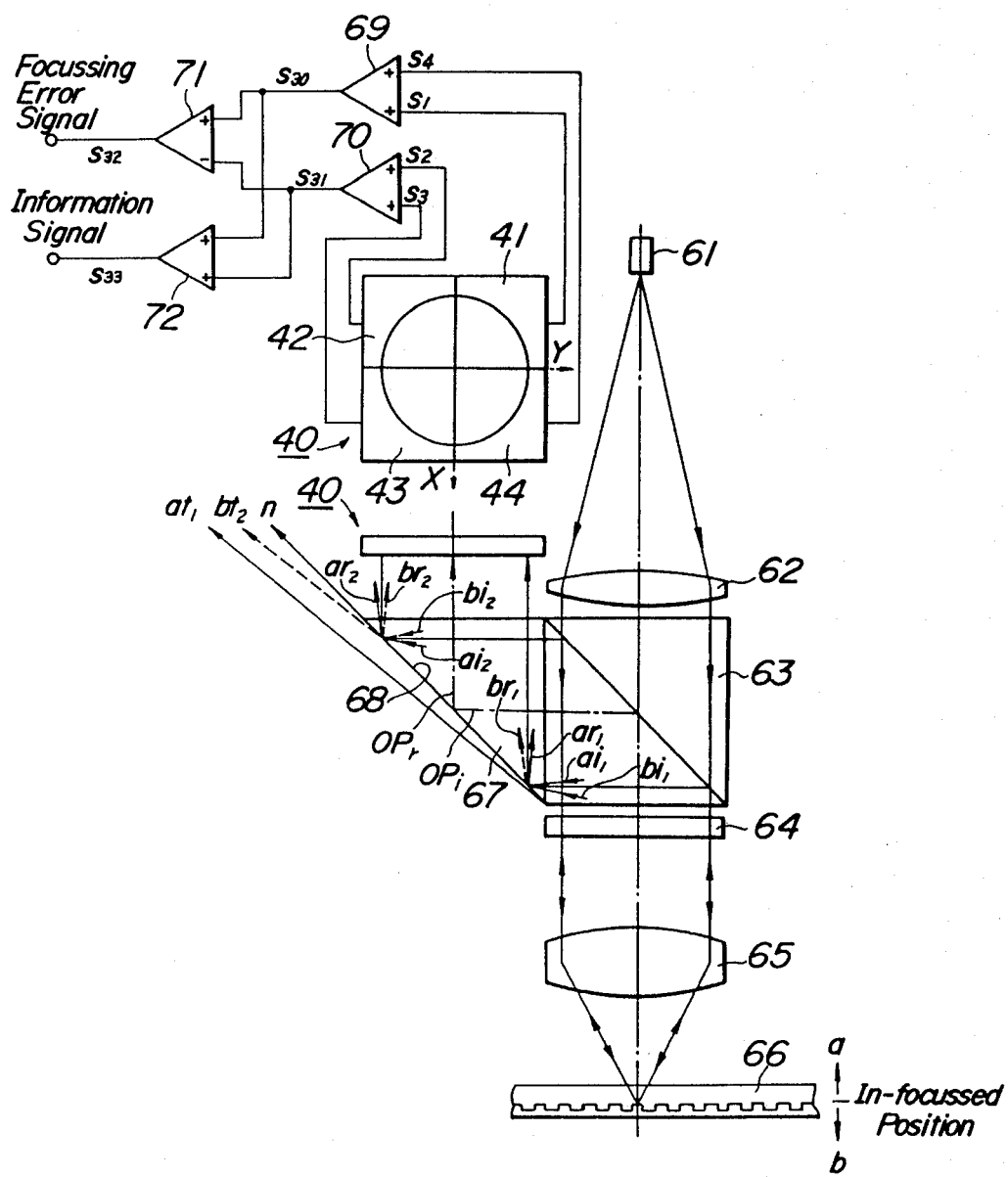
FIG. 6 is a schematic diagram illustrating an embodiment of a focussing error detecting device for use in the signal detection system according to the invention.

FIG. 4 is a block diagram showing an embodiment of a signal processing circuit for use in the signal detecting system according to the invention. FIG. 4 does not show the optical system for receiving the light flux reflected from the record medium such as an optical video disc. The optical system shown in FIG. 1 may be used in the present invention for this purpose. According to the invention a light detector 40 is arranged in a far field of the information track and comprises four light receiving regions 41 to 44 divided about an optical axis of the incident light beam in orthogonal directions X and Y, wherein Y is in parallel with a direction in which the track extends, i.e. a track direction and X is perpendicular to the track direction. Output signals $S_1$ and $S_3$ from the diagonally aligned regions 41 and 43 are supplied to a first adder 45 to derive a first sum $S_5$ and output signals $S_2$ and $S_4$ from the remaining diagonally aligned regions 42 and 44 are supplied to a second adder 46 to generate a second sum $S_6$. Further the first and second sums $S_5$ and $S_6$ are supplied to a third adder 47 to generate a sum signal $S_7 = S_5 + S_6$ and at the same time are supplied to a subtractor 48 to produce a difference signal $S_8 = S_5 - S_6$. As shown in FIG. 5A, the difference signal $S_8$ has a polarity in dependence upon a direction of deviation of the light spot with respect to the track. The sum signal $S_7$ illustrated in FIG. 5B is modulated by the pit construction of the information track. Therefore, the sum signal $S_7$ constitutes an information signal having a frequency equal to the pit frequency and a phase which is shifted by $\pi/2$ with respect to the difference signal $S_8$. The sum signal $S_7$ from the adder 47 is supplied to a leading edge pulse generator 49 and a trailing edge pulse generator 50, and the difference signal $S_8$ from the subtractor 48 is supplied in parallel to first and second gate circuits 51 and 52. The first and second pulse generators 49 and 50 generate first and second sampling pulses $S_{25}$ and $S_{26}$ shown in FIGS. 5C and 5D, respectively at positive going and negative going zero cross points, respectively of the sum signal $S_7$ illustrated in FIG. 5B. The first and second sampling pulses $S_{25}$ and $S_{26}$ are supplied to the first and second gate circuits 51 and 52, respectively to sample the difference signal $S_8$ at the respective timings. Sampled values from the gate circuits 51 and 52 are held in first and second hold circuits 53 and 54, respectively. FIG. 5E shows an output signal $S_{27}$ from the first hold circuit 53 which holds difference signal values sampled by the first sampling pulses $S_{25}$ from the first pulse generator 49 and FIG. 5F illustrates an output signal $S_{28}$ from the second hold circuit 52 which generates the values sampled by the second sampling pulses $S_{26}$ from the second pulse generator 50. The output signals $S_{27}$ and $S_{28}$ are supplied to an RF differential amplifier 55 to derive a difference therebetween. In this manner the differential amplifier 55 produces at its output 56 a tracking error signal $S_{29}$ shown in FIG. 5G.

According to the invention, the difference signal $S_8$ is sampled by the sampling pulses $S_{25}$ and $S_{26}$ generated at the zero cross points of the sum signal $S_7$ with taking into account the phase difference of $\pi/2$ between the sum and difference signals $S_7$ and $S_8$. This is equivalent to derive peak-to-peak values of the difference signal $S_8$ with the polarity in accordance with the direction of the spot deviation with respect to the track and thus, the signal obtained can be used as the tracking error signal $S_{29}$. According to the invention, since the frequency of the sampling pulses is always equal to the pit frequency of the information signal, it is possible to obtain an accurate tracking error signal even if the pit frequency fluctuates. Moreover, this can be realized by a simple and cheap circuit construction without the need for a complicated and expensive phase locked loop for compensating the phase difference between the sum and difference signals $S_7$ and $S_8$.

As explained above, according to the invention it is possible to derive an accurate tracking error signal having an amplitude and polarity representing the amount and direction, respectively, of the deviation of the beam spot relative to the information track in the optical disc. As described in the preamble, in the actual reproducing apparatus it is also necessary to detect the refocussing error signal which represents the deviation of the beam spot with respect to the track in the direction of the optical axis of the objective lens. The applicant has developed a focus detection apparatus which can detect a focussing condition in an accurate manner with a small optical system and in which a light detector can be arranged easily without need for precise adjustment.

Figure 7:
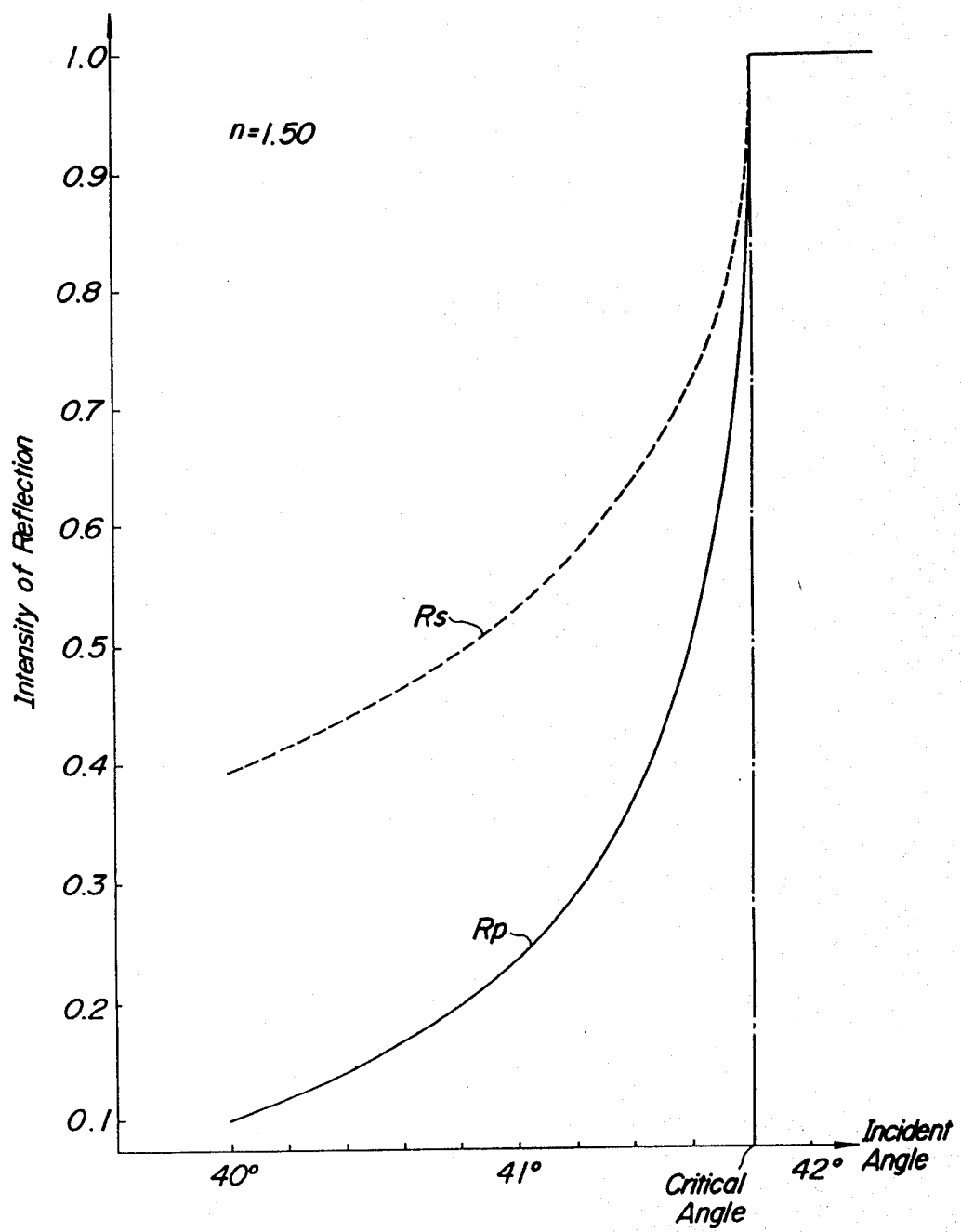
FIG. 7 is a graph showing an intensity of reflection light near a critical angle.

FIG. 6 is a schematic view illustrating an optical pick-up apparatus comprising an embodiment of the focus detection apparatus disclosed in the commonly assigned U.S. Pat. No. 4,390,781 to Ito et al. In this embodiment, a light beam (linearly polarized in a plane of the drawing) emitted from a laser light source 61 is collimated into a parallel light beam by a collimator lens 62 and passes through a polarizing prism 63 and a quarter-wavelength plate 64. Then, the parallel light beam impinges upon an objective lens 65 and is focussed on an information track of a disc 66 as a light spot. The light beam is reflected by an information track (record surface) having a crenellated pit construction of the disc 66 and is optically modulated in accordance with information recorded in the track. Then the light beam is reflected by the polarizing prism 63, because the light beam is polarized in a direction perpendicular to the plane of the drawing and thus, it passes through the quarter-wavelength plate 64 twice. The light flux reflected by the polarization prism 63 impinges upon a detection prism 67 having a reflection surface 68 and the light flux reflected by this surface 68 is received by a light detector 40. The reflection surface 68 is so arranged with respect to the incident light that under an in-focussed condition it makes a given angle with respect to the incident light (parallel light flux) which angle is equal to a critical angle or slightly smaller or greater than the critical angle. Now, for the time being, it is assumed that the reflection surface 68 is set at the critical angle. In the in-focussed condition, the whole light flux reflected by the polarizing prism 63 is totally reflected by the reflection surface 68. In practice, a small amount of light is transmitted into a direction n shown in FIG. 6 due to incompleteness of a surface condition of the reflection surface 68. However, such a small amount of transmitted light may be ignored. If the disc 66 deviates from the in-focussed condition in a direction a in FIG. 6 and a distance between the objective lens 65 and the disc 66 is shortened, the light reflected by the polarizing prism 63 is no longer on parallel beam, but changes into a diverging light beam including extreme light rays $ai_1$ and $ai_2$. On the contrary, if the disc 66 deviates in an opposite direction b, the parallel light beam is changed into a converging light beam including extreme light rays $bi_1$ and $bi_2$. As can be seen in FIG. 6, light rays from an incident optical axis $OP_i$ to the extreme light ray $ai_1$ have incident angles smaller than the critical angle and thus, are transmitted through the reflection surface 68 at least partially as illustrated by $at_1$ (the reflected light being shown by $ar_1$). Contrary to this, light rays between the optical axis $OP_i$ and the extreme light ray $ai_2$ have incident angles larger than the critical angle and thus, are totally reflected by the surface 68 as shown by $ar_2$. In case of deviation of the disc 66 in the direction b, the above relation becomes inversed, and light rays below a plane which includes the incident optical axis $OP_i$ and is perpendicular to the plane of the drawing of FIG. 6, i.e. a plane of incidence, are totally reflected by the reflection surface 68 as denoted by $br_1$, and light rays above said plane are at least partially transmitted through the reflection surface 68 as depicted by $bt_2$ (the reflected light being illustrated by $br_2$). As explained above, if the disc 66 deviates from the in-focussed position, the incident angles of the light rays impinging upon the reflection surface 68 vary in a continuous manner about the critical angle except for the center light ray passing along the optical axis $OP_i$. Therefore, when the disc 66 deviates from the in-focussed position either in the direction a or b, the intensity of the light reflected by the reflection surface 68 varies abruptly near the critical angle in accordance with the above mentioned variation in the incident angles as illustrated in FIG. 7. In this case, senses of the variations of the light intensities on both sides of said plane perpendicular to the incident plane and including the incident optical axis $OP_i$ vary in mutually opposite manner. On the contrary, in the in-focussed condition, the light flux impinging upon the detection prism 67 is totally reflected by the reflection surface 68 and thus, the uniform light flux impinges upon the light detector 40. The light detector 40 is so arranged that the lower and upper light fluxes with respect to said plane are separately received by light receiving regions 41, 44 and 42, 43, respectively. That is to say, the light detector 40 is divided in the orthogonal directions X and Y and the direction X is in a plane which is perpendicular to the incident plane and includes an optical axis $OP_r$ of reflected light.

FIG. 7 shows a graph representing a variation of an intensity of reflected light in accordance with an incident angle near the critical angle. Curves $R_p$ and $R_s$ indicate the light intensitites for P and S polarized light rays, respectively. As shown in FIG. 7, the detection sensitivity for P polarized light higher than that for S polarized light. The curves are obtained when the detection prism 67 is made of material having a refractive index of 1.50. It should be noted that an intensity of a non-polarized light ray is equal to an intermediate value of $(R_p+R_s)/2$.

In FIG. 6, if the disc 66 deviates in the direction a, the light rays of the lower half of the incident light flux have incident angles smaller than the critical angle. Therefore, at least a part of the lower half light flux is transmitted through the reflection surface 68 and the amount of light impinging upon the light receiving regions 41, 44 is decreased by an amount equal to the transmitted light. While the upper half of the incident light flux has the incident angles larger than the critical angle and thus, is totally reflected by the surface 68. Therefore, the amount of light impinging upon the light receiving regions 42, 43 is not changed. On the contrary, if the disc 66 deviates in the direction b, the amount of light impinging upon the regions 42, 43 is decreased, but the amount of light impinging upon the regions 41, 44 is not changed. In the in-focussed condition, amounts of light impinging upon the regions 41, 44 and 42, 43 are made equal to each other.

It should be noted that the reflection surface 68 may be set at an angle slightly smaller or larger than the critical angle. In a former case when the disc 66 deviates in the direction a, the amount of light impinging upon the regions 42, 43 is first increased and then becomes constant and the amount of light impinging upon the regions 41, 44 is decreased abruptly. Whereas, if the disc 66 deviates in the direction b, the amount of light impinging upon the regions 41, 44 is first increased and then becomes constant, while the amount of light impinging upon the regions 42, 43 is decreased.

Output signals $S_1$ and $S_4$ from the regions 41 and 44 aligned in the direction X are supplied to a first adder 69 to generate a first sum $S_{30}$, and output signals $S_2$ and $S_3$ from the regions 42 and 43 aligned in the direction Y are fed to a second adder 70 to produce a second sum $S_{31}$. Then by detecting a difference signal $S_{32}$ between the sums $S_{30}$ and $S_{31}$ from the first and second adders 69 and 70 by means of a differential amplifier 71, it is possible to obtain the focussing error signal having an amplitude which is proportional to an amount of the deviation from the in-focussed condition and a polarity which represents a direction of the deviation with respect to the in-focussed condition. The focussing error signal thus obtained is used to effect a focussing control for driving the objective lens 65 in the direction of its optical axis. Further, it is possible to derive an information signal corresponding to the pit information recorded in the information track in the disc 66 at an output of a third adder 72 which produces a sum signal $S_{33}$ of the sums $S_{30}$ and $S_{31}$ from the adders 69 and 70. Further, in case of setting the reflection surface 68 just at the critical angle, in the in-focussed condition, since the light is scarcely transmitted through the reflection surface 68 as shown in FIG. 12A, a loss of light is very small and in the defocussed condition a half of light flux with respect to the central light ray is totally reflected, but an amount of the other half of light flux reflected by the surface 68 is decreased to a great extent, the difference in the amount of light impinging upon the regions 41, 44 and 42, 43 becomes great and a large difference signal $S_{32}$ can be derived from the differential amplifier 71. Therefore, a very accurate focus detection can be effected with a very high sensitivity. It is also possible to set the reflection surface 68 at an angle smaller or larger than the critical angle. In such case, a difference between the sums $S_{30}$ and $S_{31}$ appears with respect to the in-focussed condition as illustrated in FIGS. 12A and 12C and thus, the focussing error signal $S_{32}$ may be equally obtained. In particular, when the reflection surface 68 is inclined with respect to the incident light axis by an angle greater than the critical angle, there is obtained an in-focussed range D as shown in FIG. 12C. In this case it is preferable to set the range D to a focal depth of the objective lens 65.

For instance, when use is made of the objective lens 65 having a numerical aperture NA=0.5 and a focal length f=3 mm and of the detection prism 67 having a refractive index n=1.50 and the disc 66 deviates by about 1 $\mu$m, a variation of an incident angle for the extreme right ray which is subjected to the largest variation in incident angle is about 0.015° which can cause a sufficiently large variation in light amount impinging upon the detector regions 41, 44 and 42, 43.

Figure 8:
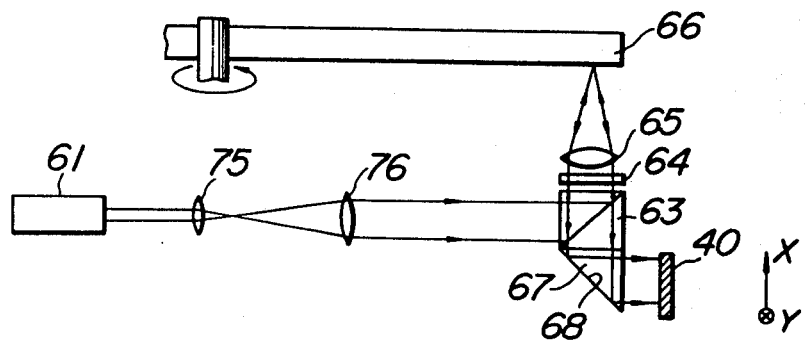
FIG. 8 is a schematic view depicting another embodiment of the optical system for use in the signal detection system according to the invention.
Figure 9:
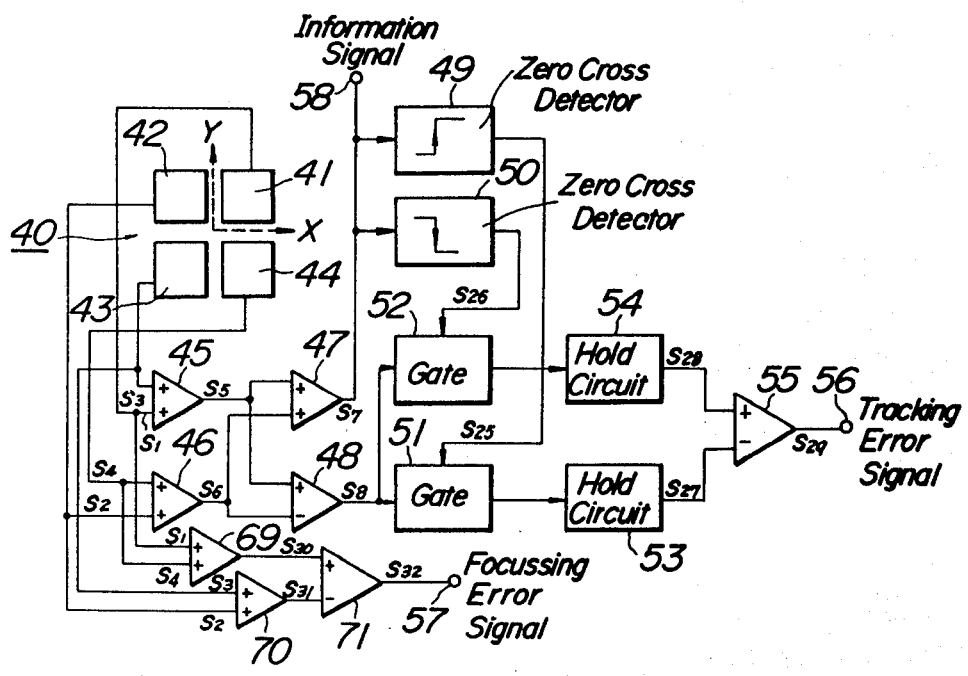
FIG. 9 is a block diagram showing a signal processing circuit according to the invention.

FIGS. 8 and 9 show an embodiment of the optical reproducing apparatus comprising the focussing error detection device shown in FIG. 6 to derive the tracking error signal, the focussing error signal and the information signal. As illustrated in FIG. 8, a laser light beam emitted from a laser light source 61 is converted into a parallel light beam by lenses 75 and 76 which is then made incident upon a polarizing prism 63. The light flux reflected by the prism is transmitted through a quarter-wavelength plate 64 and an objective lens 65 onto an information track of a disc 66 as a light spot. The light flux reflected by the disc is collected by the lens 65, transmitted through the plate 64 and prism 63 and is made incident upon a light detector 40 which is positioned in a far field of the information track of the disc 66. As shown in FIG. 9, the light detector 40 comprises four light receiving regions 41 to 44 divided in the orthogonal directions X and Y about the optical axis of the incident light flux. In the present embodiments similar elements to those shown in FIGS. 4 and 6 are denoted by the same reference numerals used in FIGS. 4 and 6. In this embodiment the track direction Y is perpendicular to the incident plane to a reflection surface 68 of a triangular detection prism 67. A tracking error signal $S_{29}$ can be obtained at an output terminal 56 from a sum signal $S_7$ and a difference signal $S_8$ supplied from an adder 47 and a differential amplifier 48, respectively as explained above in detail with reference to FIG. 4. Similarly an information signal can be obtained at an output terminal 58 as the sum signal $S_7$. Further, a focussing error signal can be obtained at an output terminal 57 as a difference signal $S_{33}$ between sums $S_{30}$ and $S_{31}$ as fully described with reference to FIG. 6. In this manner the information signal and focussing error signal as well as the tracking error signal can be derived accurately from the single light detector which receives the single light beam.

Figure 10:
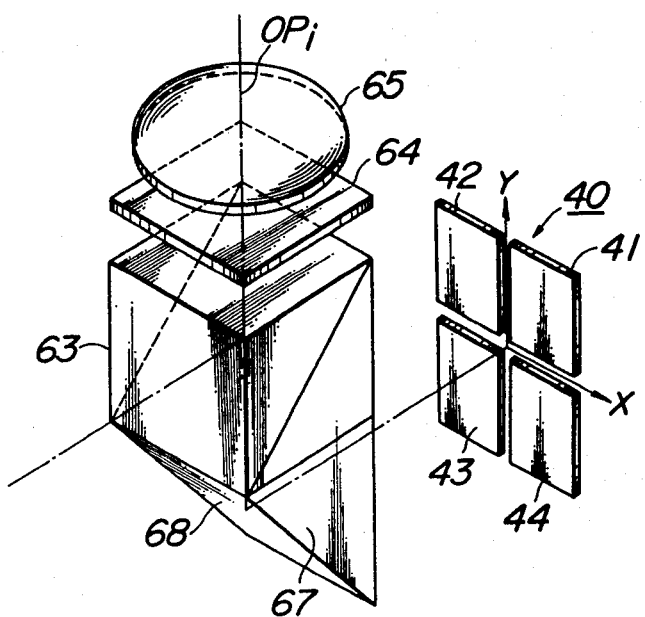
FIG. 10 is a perspective view illustrating another embodiment of the optical system for use in the signal detection system according to the invention.

FIG. 10 is a perspective view showing another embodiment of the optical system for use in the signal detection system according to the invention. In this embodiment the detection prism 67 and the light detector 40 of the embodiment shown in FIG. 8 are rotated by 90° about the incident optical axis $OP_i$ so as to make the incident plane to the reflection surface 68 in parallel with the track direction Y. By rotating the detection prism 67 by 90°, the P polarized light is made incident upon the reflection surface 68 and thus, the sensitivity of detecting the focussing error signal can be further increased as can be seen from the graph in FIG. 7.

In the embodiment shown in FIG. 8, when a depth of pits constituting the information track is equal to a quarter-wavelength of the light beam, the focussing and tracking error signals can be detected accurately, but when the pits have the depth other than a quarter-wavelength, a variation in light distribution in the direction X will appear at an exit pupil of the objective lens 65 due to the tracking error and this direction X of the variation is same as that caused by the focussing error and thus, the focussing error signal might be disturbed by the tracking error. Contrary to this, in the embodiment illustrated in FIG. 10, since the detection prism 67 is so arranged that the incident plane to the reflection surface 68 is made in parallel with the track direction Y, the variation in light distribution due to the focussing error appears in the track direction Y and the variation in light distribution due to the tracking error appears in the direction X. Therefore, the focussing error signal is not affected by the tracking error and thus, it is possible to always obtain the accurate focussing error signal even if the pit depth is not equal to a quarter-wavelength. It should be noted that in the embodiment shown in FIG. 10, since the variation in light distribution due to the tracking error appears in the track direction Y, the focussing error signal must be derived by a difference between a first sum of output signals from the light receiving regions 41 and 42 and a second sum of output signals from the light receiving regions 43 and 44.

Figure 11A:
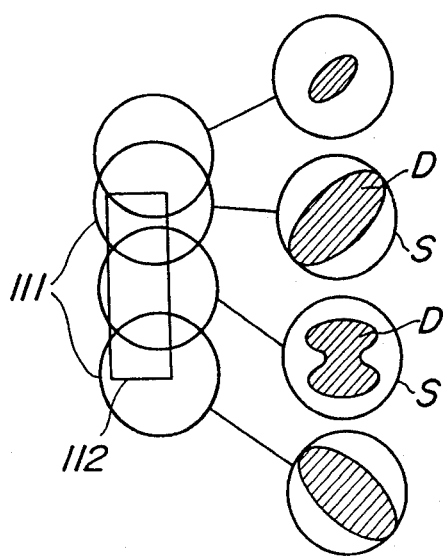
FIGS. 11A and 11B are schematic views representing a relation of a beam pattern and a position of a light spot with respect to a pit.
Figure 11B:
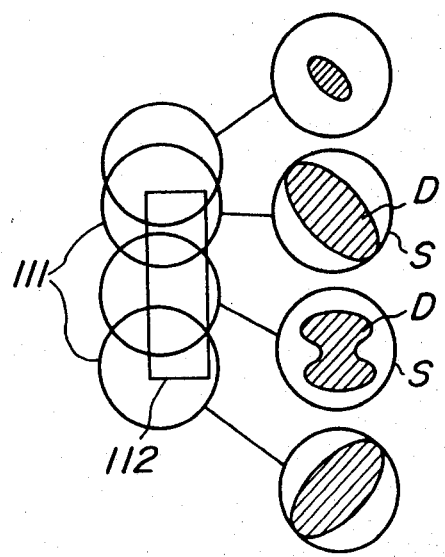

FIGS. 11A and 11B show a relation between mutual positions of the light spot and pit and patterns of light distribution at the exit pupil of the objective lens. In FIG. 11A, the light spot 111 moves relative to the pit 112 with deviating rightward and in FIG. 11B, the light spot 111 deviates leftward with respect to the pit 112. A hatched area D denotes a dark portion produced in the light beam having a cross section shown by a circle S. According to the invention, in order to detect the tracking error signal, the difference signal $S_8$ is sampled by the sampling pulses generated at the zero cross points of the sum signal $S_7$. As can be seen from FIGS. 11A and 11B, these zero cross points correspond to the times where the beam spot 111 is situated at front and rear edges of the pits 112. At such times the pattern of the dark portion D in the beam S are made greatly different depending upon the direction of deviation of the spot 111 with respect to the pit 112. Therefore, the tracking error signal can be obtained very accurately with high sensitivity.

In the embodiment shown in FIGS. 8 to 10, the information signal, the tracking error signal and the focussing error signal can be detected simultaneously by means of a single optical system without dividing the light beam. Therefore, a loss of light can be minimized, the signals can be detected efficiently and precisely, and the apparatus can be constructed economically in a compact manner. Further, since it is sufficient to arrange the light detector 40 in a far field of the information track, the detector can be positioned at any point on the exit optical axis of the detection prism 67 except for an image plane of the objective lens. Therefore, any precise adjustment of the light detector is not necessary at all. Moreover, the optical path length can be made short and the whole apparatus can be constructed in a compact manner.

FIGS. 12A, 12B and 12C are graphs representing the variation of the sum signals $S_{30}$ and $S_{31}$ in dependence upon the deviation from the in-focussed condition in case of setting the reflection surface 68 of the detection prism 67 at an angle smaller than, equal to and larger than the critical angle, respectively.

FIG. 13 illustrates another embodiment of the optical system for use in the signal detection system according to the invention. In this embodiment, a light beam emitted from a light source is reflected by a polarizing prism 63 and a light flux reflected from a disc through a quarter-wavelength plate 64 is then transmitted through the polarizing prism 63 and is made incident upon an elongated detection prism 67' in the form of plane parallel plate having parallel reflection surfaces 68' which are set substantially at a critical angle. The incident light beam is reflected between the reflection surfaces 68' a plurality of times. During the reflections, an amount of light reflected by these surfaces 68' is not decreased, but a total amount of light transmitted through and refracted by the surfaces 68' is progressively increased. Therefore, the difference in light and dark portions of the light beam incident upon the light detector 40 is enhanced to a great extent and thus, the focussing error signal can be detected with a higher sensitivity.

Figure 14:
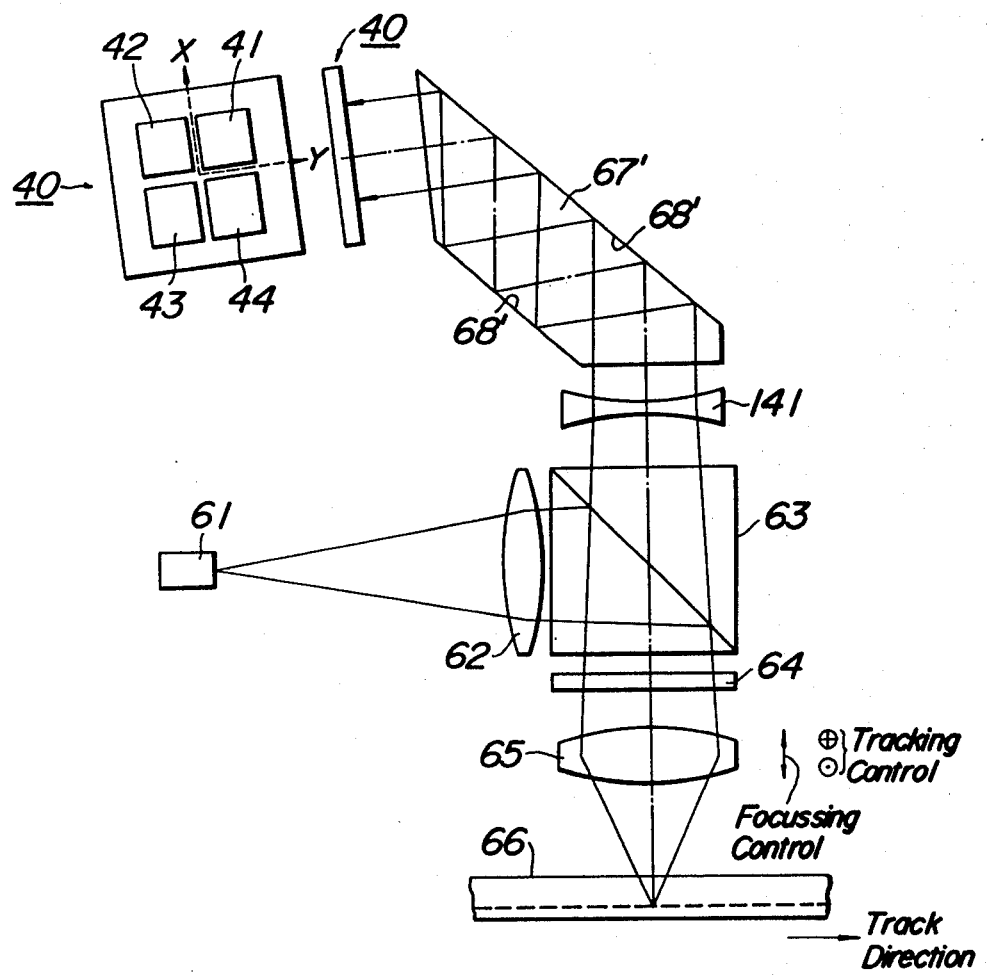
FIG. 14 is a schematic view illustrating still another embodiment of the optical system for use in the signal detection system according to the invention.

FIG. 14 shows still another embodiment of the optical system for use in the signal detection system according to the invention. In this embodiment use is made of an elongated detection prism 67' having parallel reflection surfaces 68' and a light beam is reflected therebetween a plurality of times. A laser light beam (polarized perpendicularly to a plane of the drawing) emitted from a laser light source 61 is converted into diverging light flux by a convex lens 62 and is made incident upon a polarizing prism 63. The light flux reflected by the prism 63 is made incident upon a disc 66 by means of a quarter-wavelength plate 64 and an objective lens 65. The light flux reflected by the disc is collected by the lens 65 and is made incident upon a convex lens 141 by means of the plate 64 and the polarizing prism 63 as a converging beam. This converging light beam is converted by the lens 141 into a parallel light beam having a smaller diameter and the converted parallel light flux is made incident upon a detector 40 by means of a detection prism 67' having parallel reflection surfaces 68'. The light detector 40 is arranged in a far field of the track and comprises four light receiving regions 41 to 44 divided in the orthogonal directions X and Y. Since the light flux impinging upon the detection prism 67' and the light detector 40 has a small diameter, they may be made small in size and light in weight.

FIG. 15 is a block diagram showing another embodiment of the signal processing circuit for use in the signal detection system according to the invention. In the embodiments shown in FIGS. 4 and 9, the sampling pulses are generated at both the positive going and negative going zero cross points of the sum signal $S_7$. However, according to the invention this is not always necessary, but the sampling pulses may be obtained at either positive going or negative going zero cross points. In FIG. 15 those parts which are the same as those shown in FIGS. 4 and 9 are denoted by the same reference numerals used in FIGS. 4 and 9. In this embodiment a sum signal $S_7$ shown in FIG. 16B is supplied to a pulse generator 49 which produces sampling pulses $S_{25}$ at positive going zero cross points of the sum signal $S_7$ as illustrated in FIG. 16C. The sampling pulses thus produced are supplied to a gate circuit 51 to sample the difference signal $S_8$ shown in FIG. 16A and sampled values are held in a holding circuit 53. An output signal $S_{27}$ from the holding circuit 53 is supplied to one input of a differential amplifier 55 and to a second input thereof is applied a reference voltage having a suitable level from a potentiometer 151 so as to derive a difference between the sampled value $S_{27}$ and the reference voltage. In this manner a tracking error signal $S'_{29}$ shown in FIG. 16D can be obtained at an output terminal 56.

As explained above, according to the invention, the difference signal $S_8$ may be sampled at either positive going or negative going zero cross points of the sum signal $S_7$. In this case although the sampling period becomes twice as that of the previous embodiments, the tracking error signal shown in FIG. 16D is sufficiently accurate for practical use.

FIG. 17 is a block diagram showing still another embodiment of signal processing circuit of the signal detection system according to the invention. Also in this embodiment, the tracking and focussing error signals as well as the information signal can be derived from the single light beam. The tracking error signal can be derived in entirely the same manner as shown in FIG. 15, the focussing error signal is obtained in the same manner as illustrated in FIG. 6, and the information signal is produced in the same way as shown in FIG. 9. In FIG. 17, portions similar to those shown in FIGS. 6, 9 and 15 are denoted by the same reference numerals as those used in FIGS. 6, 9 and 15. The operation of this embodiment can be clearly understood from the previous embodiments and therefore, a detailed description may be omitted.

The tracking and focussing control may be effected by controlling tracking and focussing servo control mechanisms, respectively with the aid of the tracking and focussing error signals detected in the manner mentioned above. These tracking and focussing servo control mechanisms may be formed in various ways. For instance, use may be made of a tracking servo control mechanism comprising a swingable galvano-mirror arranged between the light source and the objective lens and a coil of the galvano-mirror is driven in accordance with the tracking error signal so as to move the light spot in the direction perpendicular to the track direction. Further, use may be made of an objective lens driving device developed by the applicant and described in a co-pending U.S. patent application Ser. No. 139,756 filed on Apr. 14, 1980. In this device, the objective lens may be directly moved in the direction perpendicular to the track direction in accordance with the tracking error signal. As the focussing servo control mechanism a moving coil system may be used to move the objective lens in the direction of its optical axis in accordance with the focussing error signal.

The present invention can provide many advantages which may be summarized as follows.

(1) Since the system for detecting the tracking error signal does not require an expensive and complicated phase locked loop, the whole system can be made simple in construction and less expensive.

(2) Since the tracking error signal is not influenced by the fluctuation of the pit frequency of the sum signal $S_7$ a very accurate detection can be attained.

(3) When the sampling pulses are generated at both the positive and negative going zero cross points of the sum signal $S_7$, the tracking error signal can be detected much more accurately and further the reference voltage can be omitted.

(4) When the light flux reflected by the disc is made incident upon the light detector by means of the reflection surface which is set substantially at the critical angle, not only the tracking error signal, but also the focussing error signal can be detected with a very high sensitivity.

(5) By suitably setting the reflection surface with respect to the track direction, it is possible to eliminate the interference between the tracking and focussing error signals and thus, the detection precision can be further improved.

(6) Since the tracking error signal, focussing error signal and information signal can be derived by the single light detector which receives the single light beam reflected from the disc, these signals have large gain and the compact and effective reproducing head can be realized.

What is claimed is:

1. In a signal detection system for use in an optical reproducing apparatus in which a light beam emitted from a light source is made incident by means of an objective lens upon a record medium having recorded thereon an information signal along one or more tracks and in which the light beam modulated by the information signal and collected by the objective lens is received by a light detector arranged in a far field of the track and comprising four light receiving regions divided about an optical axis of the incident light beam in orthogonal directions, one direction being in parallel with a track direction and the other direction being perpendicular to the track direction, the improvement comprising:

means for deriving a first sum $S_5$ of output signals $S_1$ and $S_3$ from diagonally aligned light receiving regions and a second sum $S_6$ of output signals $S_2$ and $S_4$ from remaining diagonally aligned light receiving regions;

means for deriving a sum signal $S_7$ of the first and second sums $S_5$ and $S_6$ and a difference signal $S_8$ between the first and second sums $S_5$ and $S_6$;

means for generating sampling pulses at predetermined zero cross points of said sum signal $S_7$;

means for sampling said difference signal $S_8$ by said sampling pulses to generate sampled values and holding the sampled values; and means for processing the sampled values to derive a tracking error signal representing the amount and direction of deviation of the light spot with respect to the track in a direction perpendicular to the track direction.

2. A signal detection system according to claim 1, wherein said sampling pulses are generated at both positive and negative going zero cross points of the sum signal, said difference signal is sampled separately by the sampling pulses corresponding to the positive going zero cross points to derive first sampled values and by the sampling pulses corresponding to the negative going zero cross points to derive second sampled values and said tracking error signal is derived by forming a difference between said first and second sampled values.

3. A signal detection system according to claim 1, wherein said sampling pulses are produced at one of said positive and negative going zero cross points and said tracking error signal is derived by comparing the sampled values with a reference value.

4. A signal detection system according to claim 1, wherein the information signal is derived from said sum signal $S_7$.

5. A signal detection system according to claim 1, wherein a beam splitting element is arranged between the light source and the objective lens and the light flux reflected by the record medium is directed by the beam splitting element toward the light detector.

6. A signal detection system according to claim 5, wherein said beam splitting element is composed of a polarizing prism and said light beam is constituted by a polarized light beam.

7. A signal detection system according to claim 6, wherein a quarter-wavelength plate is arranged between the polarizing prism and the objective lens.

8. A signal detection system according to claim 1, further comprising at least one reflection surface constituted by a boundary surface between high and low refractive index material arranged between the objective lens and the light detector, means for deriving third and fourth sums $S_{30}$ and $S_{31}$ of output signals from a respective pair of light receiving regions aligned in a direction perpendicular to an incident plane to said reflection surface, and means for deriving a second difference signal from said third and fourth sums as a focusing error signal representing the amount and direction of deviation of the objective lens with respect to the record medium in a direction of an optical axis of the objective lens.

9. A signal detection system according to claim 8, wherein said reflection surface is so arranged that said incident plane is made perpendicular to the track direction.

10. A signal detection system according to claim 8, wherein said reflection surface is so arranged that said incident plane is made parallel to the track direction.

11. A signal detection system according to claim 8, wherein said reflection surface is oriented such that an incident angle of an incident light beam to said reflection surface is substantially equal to a critical angle defining the smallest incident angle at which incident light is reflected from said reflection surface without significant transmission through said reflection surface.

12. A signal detection system according to claim 8, wherein said reflection surface is oriented such that an incident angle of an incident light beam to said reflection surface is greater than a critical angle defining the smallest incident angle at which incident light is reflected from said reflection surface without significant transmission through said reflection surface.

13. A signal detection system according to claim 8, wherein said reflection surface is oriented such that an incident angle of an incident light beam to said reflection surface is less than a critical angle defining the smallest incident angle at which incident light is reflected from said reflection surface without significant transmission through said reflection surface.

14. A signal detection system according to claim 8, wherein said reflection surface is formed by a prism.

15. A signal detection system according to claim 14, wherein said prism has two parallel reflection surfaces and the light beam is reflected therebetween a plurality of times.

16. A signal detection system according to claim 8, wherein said sampling pulses are generated at both positive and negative going zero cross points of the sum signal, said difference signal is sampled separately by the sampling pulses corresponding to the positive going zero cross points to derive first sampled values and by the sampling pulses corresponding to the negative going zero cross points to derive second sampled values and said tracking error signal is derived by forming a difference between said first and second sampled values.

17. A signal detection system according to claim 8, wherein said sampling pulses are produced at one of said positive and negative going zero cross points and said tracking error signal is derived by comparing the sampled values with a reference value.

18. A signal detection system according to claim 8, wherein the information signal is derived from said sum signal $S_7$.

19. A signal detection system according to claim 8, wherein a beam splitting element is arranged between the objective lens and the reflection surface and the light flux reflected by the record medium is directed by the beam splitting element toward the reflection surface.

20. A signal detection system according to claim 19, wherein said beam splitting element is composed of a polarizing prism and said light beam is constituted by a polarized light beam.

21. A signal detection system according to claim 20, wherein a quarter-wavelength plate is arranged between the polarizing prism and the objective lens.

22. A signal detection system according to claim 11 wherein the incident angle of an in-focus incident beam constitutes said incident angle.

23. A signal detection system according to claim 12 wherein the incident angle of an in-focus incident beam constitutes said incident angle.

24. A signal detection system according to claim 13 wherein the incident angle of an in-focus incident beam constitutes said incident angle.

* * * * *